United States Patent [19]
Denny

[11] 3,922,608
[45] Nov. 25, 1975

[54] ELECTROMAGNETIC INTERFERENCE LOCATOR

[75] Inventor: Hugh W. Denny, Decatur, Ga.

[73] Assignee: The United States of America as represented by the Secretary of the Army, Washington, D.C.

[22] Filed: Nov. 29, 1973

[21] Appl. No.: 420,238

[52] U.S. Cl. .............. 325/363; 325/67; 324/72.5; 324/149
[51] Int. Cl.² .......................... H04B 17/00
[58] Field of Search .......... 325/67, 133, 134, 363, 325/364; 179/175.1 R; 324/57 N, 72.5, 76 R, 77 E, 78 F, 149, 158 P; 343/17.7; 333/82 B

[56] References Cited
UNITED STATES PATENTS

| | | | |
|---|---|---|---|
| 3,047,804 | 7/1962 | Peer et al. | 324/149 |
| 3,196,217 | 7/1965 | Petrina | 324/72.5 |
| 3,283,248 | 11/1966 | White | 324/72.5 |
| 3,296,527 | 1/1967 | Cones | 324/72.5 |
| 3,639,841 | 2/1972 | Richardson | 325/363 |
| 3,716,791 | 2/1973 | Harries et al. | 325/363 |

Primary Examiner—Howard W. Britton
Assistant Examiner—Jin F. Ng
Attorney, Agent, or Firm—Lawrence A. Neureither; Jack W. Voigt; Robert C. Sims

[57] ABSTRACT

A two terminal probe has two low-pass filters in series with each terminal, so as to prevent the probe and the associated circuitry from acting as an antenna and prevent the unwanted pickup of high level RF signals. A coaxial cable connects the probe to a signal processor where the normal frequencies of the unit being tested are filtered out, and the interference signal is amplified and connected to a speaker for audio detection.

4 Claims, 3 Drawing Figures

ELECTROMAGNETIC INTERFERENCE LOCATOR

BACKGROUND OF THE INVENTION

This invention is related to the field of eliminating the effect of high power, pulsed or amplitude modulated radio frequency (RF) signals which may cause interference (i.e., are erroneously detected through an undesired means) in electronic equipments, particularly those of a solid-state, i.e., transistorized, construction. Any nonlinear device such as a transistor or diode is likely to detect the high power signal. To economically eliminate the interference from equipment, the susceptible stages must be uniquely determined, and appropriate means, i.e., shielding, filtering, etc., applied only to these stages. The purpose of this invention is to provide the means by which offending elements or stages may be unambiguously determined by reasonably trained technicians and repairmen.

In older types of equipments utilizing vacuum tubes to perform amplification and detection functions, a technique has been developed for isolating those stages interfered with by high power RF signals. This technique is based on the removal of a vacuum tube on a selective basis until the manifestation of interference is eliminated from the equipment. Removal of the interference is accomplished by adding corrective measures to each stage, individually, as the vacuum tube devices are reinserted into the equipment.

In solid-state equipments, selective removal of individual amplifier detectors is impractical because:

1. the procedure is very time consuming;
2. frequently the components and/or associated wiring are damaged, compromised or destroyed in the process; and
3. considerable functional interdependence exists between stages of solid-state equipments, and, therefore, the removal of one element upsets the normal operational mode of other elements and may increase or decrease their interference susceptibility. Other locating techniques such as the use of conventional metering devices and oscilloscopes frequently inject additional RF signal energy into the circuit thereby increasing the interference to a level greater than would be experienced by the equipment alone. Another disadvantage of such devices is that their size and weight frequently render them impractical for service calls.

SUMMARY OF THE INVENTION

The electromagnetic interference locator consists of a circuit probe which has two leads adapted for connection to components of the circuit to be tested. Two low-pass filters are connected in series with each of the leads so as to filter out unwanted high level RF energies but allow the passage of low frequency or audio components which represent the interference signals. The signal sensed by the probe is sent through a coaxial cable of about 3 to 4 feet in length to a signal processor. The signal processor contains a high impedance input amplifier so as to present a high impedance to the probe and the circuit element being tested. This will prevent undesirable loading of the circuit being tested.

The signal processor further contains pairs of low-pass filters and buffer amplifiers for removing unwanted harmonic components and the inherent harmonic signal components of the particular unit being tested. For example if it were a television set being tested and the interference signals were of less than 60 Hz, then the filters would be active low-pass filters preventing the 60 Hz from passing. Further, a 60 Hz notch filter would be provided after these filters in order to further eliminate the 60 Hz television vertical sync pulses. If the frequency to be eliminated (detected) is lower than the interference frequency, then active high-pass filters would be used. In television sets the interference frequency (of this particular example) to be detected is 40 Hz. After the filtering the signal is amplified by a buffer amplifier and passed through an active bandpass filter which is designed to pass the frequency of the interference. In the television example this would be 40 Hz. A further amplifier is used to drive the signal and connects it to a speaker for an audio signal indication.

In this way the invention provides a device which a technician can use to locate the component producing the undesirable frequency output. Due to the audio output, the serviceman need not take his eyes off of where he has the probe's terminals and may easily go on to the next circuit to be tested.

DESCRIPTION OF THE PREFERRED EMBODIMENT

Figure 1:
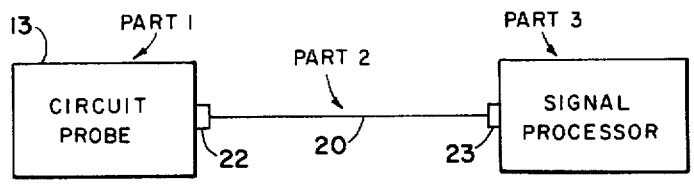
FIG. 1 is a block diagram of the present invention.

The invention consists of three principle sub-elements or parts as shown in FIG. 1.

Figure 2:
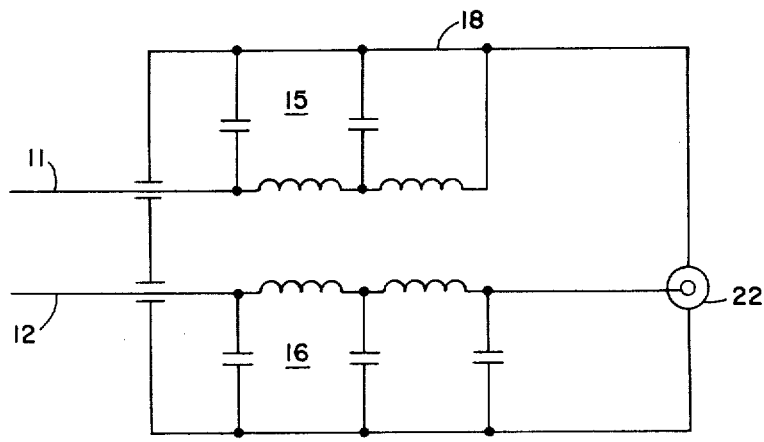
FIG. 2 is a schematic showing of the circuit probe of the present invention.

Part 1 provides the capability for probing the offended circuit or circuitry without introducing RF energy into the circuit while preventing the high level RF energy from being detected by the audio processing circuitry of the locator. FIG. 2 is a schematic diagram of Part 1. The essential elements of the circuit probe are: two relatively short (1 to 4 inches long) wire conductors 11 and 12 which permit attachment of the probe 13 to the point on the interrogated circuit where the manifestation of interference is suspected; two 5 MHz low-pass filters 15 and 16; and a metal enclosure (shield 18).

Low-pass filter 15 is in series with the lead 11 of the probe. The purpose of filter 15 is to produce a high impedance in the ground path at the RF but maintain an essentially short circuit connection at audio or base band frequencies. The high RF impedance in the ground path keeps the probe shield, the coaxial shield, and the processor circuitry from acting as an antenna to increase the pickup of the circuit or device under test. The other 5 MHz low-pass filter 16 is in series with the lead 12 and prevents the RF voltage existing on the test circuit from entering the processor circuit where it could conceivably be detected by the processor and give an erroneous indication. The probe shield 18 further prevents unwanted pickup of the high level RF signal by the signal leads.

Part 2 of the locator is shown in FIG. 1 as a moderate length [3 to 4 feet] of coaxial cable 20 which permits the bulkier signal processor, Part 3, to be remotely positioned at a point convenient for operator use and away from the test item circuitry where space is frequently limited and hazardous voltages often exist. Coaxial connectors 22 and 23 connect cable 20 to parts 1 and 3 respectively.

Part 3 processes the signal which has been generated by the high level RF voltage interacting with the circuitry and components of the victim equipment to a form which can easily be recognized by the operator. The processor performs three functions: (1) the signal to be monitored is amplified to a level sufficient to produce an audible output from a small self-contained speaker; (2) other normal functional audio signals in the victim equipment are eliminated so that they will not obscure the presence of the interference-produced response; and (3) power frequency and power supply signal components are removed.

Figure 3:
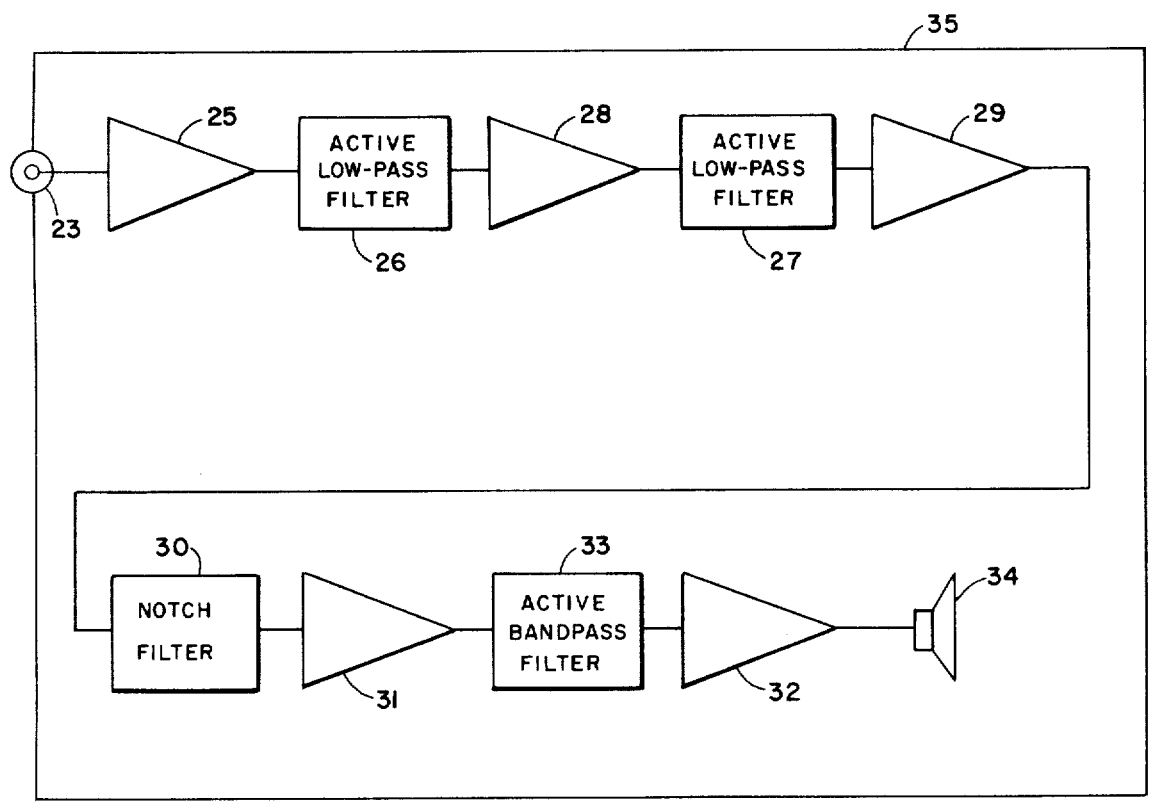
FIG. 3 is a schematic diagram of the signal processor of the present invention.

The elements which perform these functions are illustrated in block diagram form in FIG. 3. The signal from the circuit probe enters by way of connector 23 and is amplified by a buffer amplifier 25. Amplifier 25 provides a constant high impedance to the probe that is in turn reflected back into the circuit under test as a high impedance for minimum loading of the circuit.

The two active low-pass filters 26 and 27 and inverting amplifier 28 combinations remove 60 Hz harmonic components and the harmonic signal components of television vertical sync pulses. These low-pass filters are used when the interference-produced signal is less than 60 Hz. When the interference-produced signal is greater than 60 Hz, high-pass filters would be used instead. A buffer amplifier 29 sends the signal to the 60 Hz notch filter 30 which removes the remaining 60 Hz power frequency components existing in the signal.

Additional buffer amplifiers 31, driver amplifier 32, and a bandpass filter 33, tuned to the frequency of the interference-produced signal, produce the audio signal in the speaker 34 which is monitored by the operator or user of the locator. Alternate means of monitoring such as diode rectification with a meter readout could be used instead of the speaker, however, these do not have the special advantages of an audio output. The signal processor is housed by shield 35.

The above description of the invention was given with respect to the elimination of noise in a television set. This is very useful in mass production of television sets or other electronic equipment in which the frequency of the interference is known, and the harmonic signal components of the equipment being tested is known. A broader use of the invention could obviously be accomplished by making the active bandpass filter 33 variable. In this way different interference frequencies can be detected by the same detector. The notch filter 30 could be designed to eliminate any desired frequency; further, more than one notch filter could be provided in the circuit to eliminate a plurality of undesired frequencies.

In operation the serviceman takes the probe 13 and connects the wire conductors 11 and 12 across the element to be tested. Filters 15 and 16 filter out the RF energies which are generated by the unit being tested. The signal is sent through the cable connector 20 to buffer amplifier 25 which presents a high impedance to the element being tested. The signal is then sent through filters and amplifiers and a notch filter in order to eliminate known frequencies and harmonics which are present in the unit being tested. This signal is amplified and passed through a bandpass filter which is designed to pass only the frequencies of the interference. This signal (which is now the interference signal if any is present) is amplified by driver amplifier 32 and sent to a speaker 34. When interference frequency is present, speaker 34 will emit an audio signal to indicate same to the serviceman.

I claim:

1. A device comprising first and second wires each having one end adapted to be connected across a circuit to be tested; first and second filters each having an input and an output; the other end of said first and second wires being connected respectively to the inputs of said first and second filters; a shield means enclosing said first and second filters; an output connector having first and second terminals; said first terminal being connected to said shield means; said second terminal being connected to the output of said second filter means; and the output of said first filter being connected to said shield means.

2. A device as set forth in claim 1 and further comprising a signal processor which comprises a high impedance amplifier having an input and an output; connection means connecting the input of said amplifier to the terminals of said connector; filtering means having an input and an output; an indicating means having an input; and said filtering means having its input connected to the output of said amplifier and its output connected to the input of said indicating means.

3. A device as set forth in claim 2 further comprising an active bandpass filter having an input and an output; a second amplifier having an input connected to the output of said bandpass filter and an output; the output of said second amplifier being connected to said indicating means; and the input of the bandpass filter is connected to the output of said filtering means.

4. A device as set forth in claim 3 wherein said connection means is a coaxial cable; said output connector is a coaxial connector; said signal processor being inclosed by a shield means; a second coaxial connector connected through said shield means to said coaxial cable; said coaxial connectors each having a center connector connected to each other by the coaxial cable and a shield connection connected to each other by the coaxial cable; the shield of said second coaxial connector being connected to the shield of the signal processor; the center connector of said second connector being connected to the input of the high impedance amplifier; and further comprising a notch filter having an input and an output connected between the filtering means and the input of said active bandpass filter; and said indicating means being an audio speaker.

* * * * *